June 5, 1934.  P. P. PIPES  1,961,389
RAIL BOND
Filed July 24, 1929
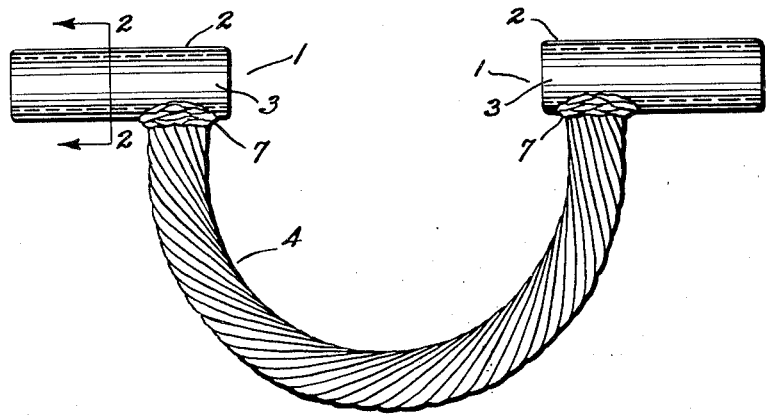
FIG. 1.
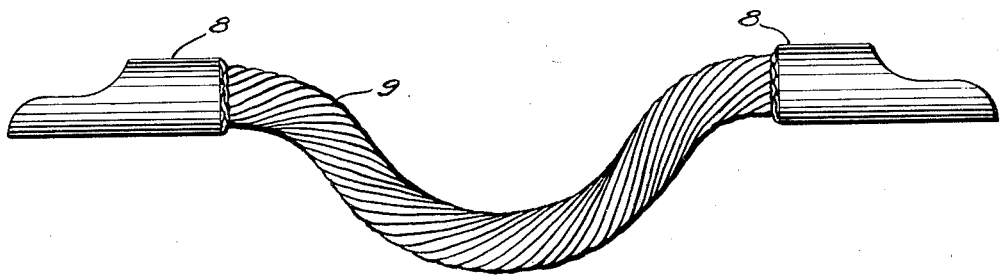
FIG. 5.
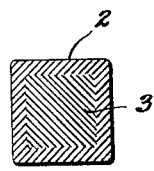    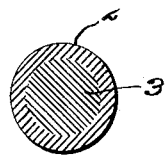
FIG. 3.  FIG. 4.  FIG. 2.
Witness:  
H. J. Stromberger
Inventor  
PLINY P. PIPES  
By  
Attorney Patented June 5, 1934

1,961,389

UNITED STATES PATENT OFFICE 1,961,389

RAIL BOND

Pliny P. Pipes, Mansfield, Ohio, assignor to The Ohio Brass Company, Mansfield, Ohio, a corporation of New Jersey Application July 24, 1929, Serial No. 380,579

2 Claims. (Cl. 173—278)

My invention relates to connectors and particularly rail bonds for connecting the adjacent ends of rails, although the device may be used for other purposes as, for instance, connecting buss bars, channel irons, etc. My invention also relates to the method of constructing such bond.

The object of my invention is to produce a device which possesses a high degree of electrical and mechanical efficiency and which can be applied to the rail by a welding flame as, for instance, the oxyacetylene or flame of the electric arc. A bond should also be of such a construction that the union of the bond to the rail will be of a high degree of efficiency.

To get these results I have combined ferrous and non-ferrous metals in a new and novel manner as hereinafter set forth in this specification and as shown in the drawing.

I employ copper preferably as the non-ferrous metal due to its high electrical conductivity and I employ steel or iron as a ferrous material because I find that steel is less subject to abrasion and mechanical injury than copper, and at the same time I find that a steel terminal lends itself to a better union with the metal used in attaching the bond to the rail.

In my bond I am able to secure it to the rail by means of fused metal, which may be either steel, iron, copper or bronze. If my terminals were of copper I would not be able to secure the bond to the rail by means of a steel or iron welding metal, but would be able to use copper or bronze welding metal.

In order to provide a terminal therefor which can be welded to the rail by fused steel, iron, copper or bronze and at the same time possess a high degree of electrical efficiency, I construct a bimetal terminal in which there is an outer sleeve or casing of ferrous metal surrounding a core of copper preferably. The ferrous and non-ferrous metals are preferably welded together.

In the drawing:—

Fig. 1 is a side view of a bond of my preferred construction.

Fig. 2 is a section of the terminal on the line 2—2 of Fig. 1 and Fig. 3 is a modification of the same in shape only.

Fig. 4 is a section of one of the individual wires making up the flexible cable connecting the terminal.

Fig. 5 is a modification of my invention.

The terminal 1 has the ferrous casing 2 and the non-ferrous core 3. The body portion 4 has each individual wire made up of a copper core 5 and a steel casing 6. This, as in the terminal, provides a high conductivity core of copper and a mechanically protecting casing of steel or iron.

Of course the bond could be made entirely of copper or entirely of steel but neither of these constructions would meet entirely the requirements. Therefore, by combining the two metals, that is a non-ferrous and ferrous in the right manner, I am able to provide an improved bond.

I prefer to unite the body and the terminals together by welding, which may be carried out by the butt welding, resistance or by the flash or percussion process, as shown at 7. All of these processes are known to those skilled in the art and require no detailed description.

In Fig. 5 I have shown the bond having a different shape of terminal 8 and which may be of solid ferrous metal, while the body 9 may have the individual wires of bi-metal as shown in Fig. 4 and the terminals and body welded together as in the case of Fig. 1.

The copper core 3 in the terminal shown in Fig. 1 reduces materially the resistance of the terminal to the flow of current as compared with a solid ferrous terminal. The body member being composed of a ferrous metal with a copper core, possesses not only a high electrical conductivity as compared with a body of steel or iron only, but it possesses a high endurance limit against breakage to flexing, a condition which the body is subjected to in use. Copper has a low endurance limit, while steel has a much higher endurance limit as set forth in my previous application.

Having described my invention, I claim:—

1. A rail bond comprising a terminal member having an outer surface of ferrous material and a conductor comprising a plurality of strands, each strand being composed of a sheath of ferrous metal surrounding a core of metal having higher electrical conductivity than said sheath, said strands having the ends thereof at one end of the conductor welded to the outer ferrous surface of said terminal member.

2. In a rail bond a terminal member comprising an outer sheath of ferrous metal surrounding a core of metal having higher electrical conductivity than said sheath, and a conductor comprising a plurality of strands, each strand being composed of an outer sheath of ferrous metal and a core of metal having higher electrical conductivity than iron, said conductor having the ends of the individual strands at one end of said conductor welded to the outer ferrous surface of said terminal member.

PLINY P. PIPES.